United States Patent [19]

Nishida

[11] Patent Number: 4,833,499
[45] Date of Patent: May 23, 1989

[54] SHUTTER SPEED SETTING APPARATUS

[75] Inventor: Takao Nishida, Urawa, Japan

[73] Assignee: Asahi Kogaku Kogyo Kabushiki Kaisha, Tokyo, Japan

[21] Appl. No.: 137,359

[22] Filed: Dec. 23, 1987

[30] Foreign Application Priority Data

Dec. 23, 1987 [JP] Japan ................................ 61-198057

[51] Int. Cl.$^4$ ......................... G03B 7/093; G03B 15/05
[52] U.S. Cl. ...................................... 354/458; 354/418
[58] Field of Search ...................... 354/418, 458, 234.1

[56] References Cited

U.S. PATENT DOCUMENTS 4,518,243  5/1985  Kobayashi ........................... 354/418

Primary Examiner—Michael L. Gellner
Attorney, Agent, or Firm—Sandler & Greenblum

[57] ABSTRACT

A shutter speed setting apparatus is provided which is arranged to respond to a main capacitor charge completion signal to judge whether or not the set value of a shutter speed S is higher than a flash synchronization speed $S_0$. If it is judged that the set value of the shutter speed S is higher than the flash synchronization speed $S_0$, the set value of the shutter speed S is temporarily stored in the form of a value M and the set value of the shutter speed S is forcibly rewritten with a given speed not higher than the flash synchronization speed $S_0$. After the main capacitor charge completion signal has disappeared, the set value of the shutter speed S is again rewritten with the temporarily stored value M. If an up/down switch is operated so as to decrease the shutter speed, the set value of the shutter speed S is decreased from the shutter speed which is forcibly rewritten.

5 Claims, 4 Drawing Sheets

SHUTTER SPEED SETTING APPARATUS

BACKGROUND OF THE INVENTION

1. Field of the Invention

The present invention relates generally to shutter speed setting apparatus for photographic cameras and, more particularly, to a shutter speed setting apparatus suitable for use in rewriting as required the shutter speed which is manually set on the photographic camera.

2. Description of the Prior Art

In general, modern photographic cameras include a plurality of one-chip microcomputers (hereinafter referred to as "CPU" or "CPUs") to provide for multiple functions which enable various kinds of settings. On the other hand, setting keys or switches corresponding to the various kinds of settings need to be disposed within an extremely narrow space. It is therefore necessary to minimize the required number of these setting keys or switches.

For this reason, it has been proposed that small setting keys are used to perform various kinds of setting by a combination of a plurality of key inputs.

In a typical example, if an up key is depressed while a shooting mode setting key is being depressed, a programmed AE shooting mode, an aperture-priority AE shooting mode, a shutter-priority AE shooting mode, and a manual shooting mode can be cyclically selected in a predetermined order. In a state wherein the shutter-priority AE shooting mode is selected, the shooting mode setting key is released and the up key is released. Then, if the up key or a down key is depressed, the shutter speed is increased or decreased in step-by-step fashion so that a desired set value of the shutter speed can be selected.

In the above-described example, however, although the number of setting keys can be reduced, the time period required for a shutter speed setting operation is extended. For this reason, there has been a demand for a reduction in the length of such a period with a view to improving the operability of a photographic camera.

As another example, in the manual shooting mode or the shutter-priority AE shooting mode, there is a case where fill-in flash is performed after photographs have been taken in daylight at manually set shutter speeds and without using any flash unit. In this case, if the manually set shutter speed is higher than a flash synchronization speed, the former shutter speed is forcibly changed to a speed which is no higher than the flash synchronization speed. This eliminates the need to manually set the shutter speed at the time of fill-in flash and therefore enables certain amount of reduction in the aforesaid time period required for a shutter speed setting operation.

However, if, after such fill-in flash, photographing is continued without using any flash unit, it may become necessary to increase the shutter speed. In this case, photographing is commonly continued at a shutter speed near the one which is set before the shutter speed is forcibly decreased. Therefore, the up key needs to be depressed to increase the shutter speed in step-by-step fashion to a desired shutter speed from the forcibly decreased shutter speed which is slower than the flash synchronization speed. This increases the time period required for the shutter speed setting operation.

In another case where a shutter speed S is manually set to 1/1,000 seconds, the shutter speed S may be forcibly rewritten with 1/100 seconds (a temporarily set value S') by turning on a flash switch of the flash unit. In this case, when the shutter speed S is to be decreased to 1/60 seconds by depressing the down key, the down key must be depressed four times in the order of 1/1,000 seconds, 1/500 seconds, 1/250 seconds, 1/125 seconds, and 1/60 seconds. In addition, the shutter speed of 1/100 seconds is continuously displayed until 1/60 seconds is reached. This requires a time-consuming setting operation.

SUMMARY OF THE INVENTION

It is therefore an object of the present invention to provide a shutter speed setting apparatus in which it is possible to reduce the time period required for a shutter speed setting operation by as required rewriting the shutter speed which is manually set.

To accomplish the above and other objects, a shutter speed setting apparatus of the present invention is arranged, as shown in FIG. 1, to respond to a main capacitor charge completion signal to judge whether or not the set value of the shutter speed S is higher than a flash synchronization speed $S_0$. If it is judged that the set value of the shutter speed S is larger than the value of the flash synchronization speed $S_0$, the set value of the shutter speed S is temporarily stored as a value M and the set value of the shutter speed S is forcibly rewritten with a given speed not higher than the flash synchronization speed $S_0$. After the main capacitor charge completion signal has disappeared, the set value of the shutter speed S is again rewritten with the temporarily stored value M. If, after completion of flash photography, photographing is continued without using a flash unit, it may become necessary to increase the shutter speeds. In this case, photographing is commonly continued at a shutter speed near the one which is set before the shutter speed is forcibly decreased. In accordance with the present invention, the shutter speed corresponding to flash photography is rewritten with the shutter speed which is set prior to the flash photography, thereby reducing the time period required for a shutter speed setting operation, and this provides an advantageous effect in improving the operability which is strongly demanded in the trend toward the incorporation of a multiplicity of functions in a photographic camera.

Moreover, during supply of a main capacitor charge completion signal, if an up/down switch is operated so as to decrease the shutter speed, the set value of the shutter speed S is decreased from the shutter speed which is forcibly rewritten. Accordingly, this also provides the advantageous effect that enables a rapid shutter speed setting operation.

The above and other objects, features and advantages of the present invention will become apparent from the following description of the preferred embodiments thereof, taken in conjunction with the accompanying drawings.

DESCRIPTION OF THE PREFERRED EMBODIMENTS

Preferred embodiments of the present invention will be described below with reference to the accompanying drawings.

Figure 1:
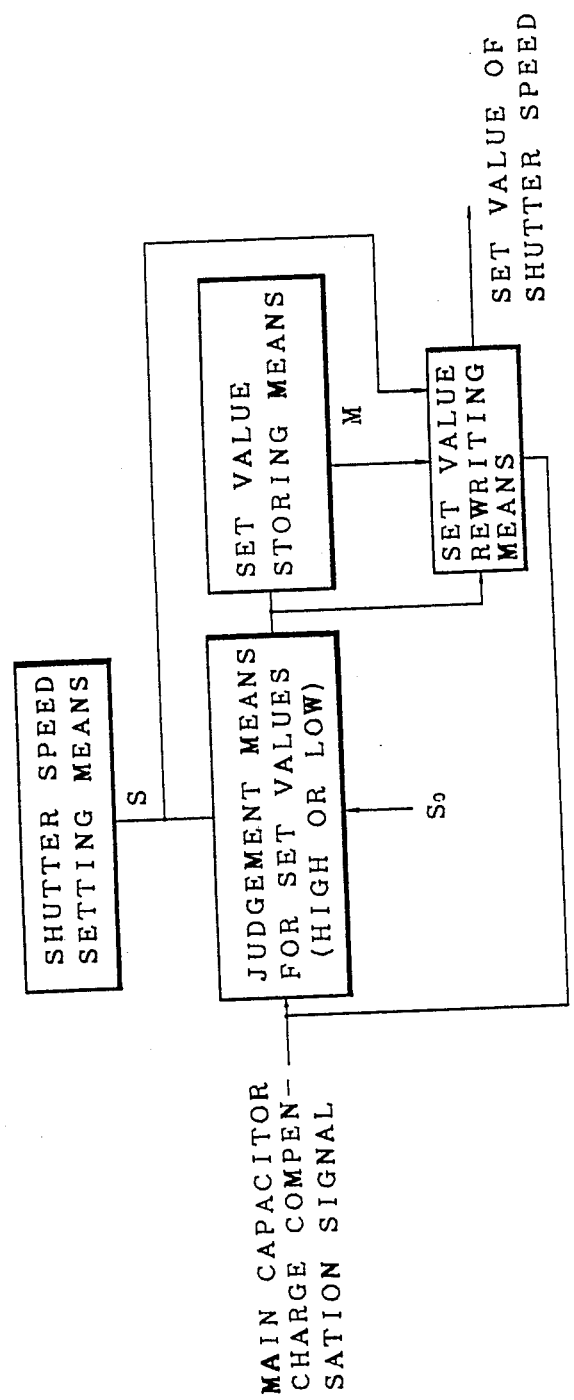
FIG. 1 is a block diagram illustrating the construction of the present invention.
Figure 2:
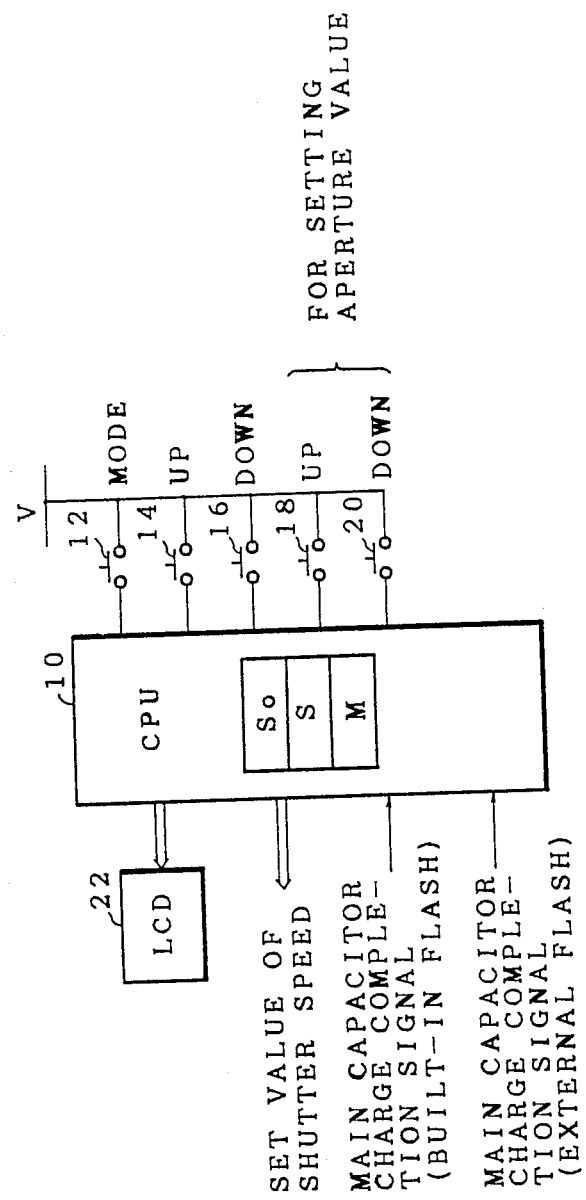
FIG. 2 is a block diagram illustrating the hardware arrangement associated with a first preferred embodiment of a shutter speed setting apparatus of the present invention.

FIG. 2 illustrates the hardware arrangement of the essential portion associated with the shutter speed setting device which is incorporated in the body of a photographic camera.

A CPU 10 includes an LCD driver (not shown) and pull-down resistors (none of which are shown) connected to its input terminals.

The input terminals of the CPU 10 are connected to a positive terminal $V_{DD}$ of an electric power source via a shooting mode switch 12, an up switch 14, a down switch 16, an up switch 18, and a down switch 20. In accordance with the operation of these switches, the CPU 10 writes set values into a RAM incorporated in the CPU 10 and, in turn, supplies display data to an LCD 22, thereby displaying the set values.

A main capacitor charge completion signal is supplied to the input terminal of the CPU 10 from an electronic flash unit (not shown) which is built in or attached as an external part to the camera body.

The CPU 10 is connected to a main CPU (not shown) for providing control over the entire circuit and, when the main CPU causes an interrupt to occur in the program of the CPU 10, the CPU 10 supplies to the main CPU the set value of the shutter speed S.

When the up switch 14 is depressed while the shooting mode switch 12 is being depressed, a programmed AE shooting mode, an aperture-priority shooting mode, a shutter-priority AE shooting mode, and a manual shooting mode are cyclically selected in a predetermined order. Also, when the down switch 16 is depressed while the shooting mode switch 12 is being depressed, those shooting modes are cyclically selected in an order reverse to the predetermined order. When the up switch 14 is depressed in the shutter-priority AE shooting mode or the manual shooting mode, the set value of the shutter speed S is increased in step-by-step fashion. When the down switch 16 is depressed in the same mode, the set value of the shutter speed S decreases in step-by-step fashion. Also, in the manual shooting mode, when the up switch 18 is depressed, an aperture value shifts upwardly in step-by-step fashion while, when the down switch 20 is depressed, the aperture setting shifts downwardly in step-by-step fashion.

The flow of a portion of the program written in the ROM of the CPU 10 will be described below with reference to FIG. 3. This program is executed when the CPU 10 receives the main capacitor charge completion signal or each time the up switch 14 or the down switch 16 is depressed.

In a case where the manual shooting mode or the shutter-priority AE shooting mode is selected, affirmative judgement is made in Step 100 or 102. At this time, if the main capacitor charge completion signal is not supplied from the electronic flash unit (not shown) which is built in or attached as an external part to the camera body, the process proceeds to Step 108 through Steps 104 and 106. In Step S108, judgement is made as to whether or not a flag F is set. Since the flag F is reset by an initialize routine (not shown), the process proceeds to Step 110, in which a normal processing is executed when the up switch 14 or the down switch 16 is depressed.

More specifically, in Step 110, when the up switch 14 is depressed once, the set value of the shutter speed S increases by one step. When the down switch 16 is depressed once, the set value of the shutter speed S decreases by one step. When the set value of the shutter speed S reaches its upper limit, the shutter speed S does not further increase even if the up switch 14 is depressed. Similarly, when reaching its lower limit, the set value of the shutter speed S does not further decrease even if the down switch 16 is depressed. Subsequently, the process returns to the main routine.

Accordingly, unless any main capacitor charge completion signal is supplied to the CPU 10, the manually set value of the shutter speed S is not forcibly rewritten.

When the CPU 10 receives the main capacitor charge completion signal from the electronic flash unit which is built in or attached as an external part to the camera body, the process proceeds from Step 104 or 106 through Step 112 to Step 114. In Step 114, judgement is made as to whether the set value of the shutter speed S is larger or smaller than the value of a flash synchronization speed $S_0$. The flash synchronization speed $S_0$ is in advance written in the ROM built in the CPU 10. In this preferred embodiment, the flash synchronization speed $S_0$ is 1/125 seconds by way of example.

If it is judged in Step 114 that the set value of the shutter speed S is smaller than the value of the flash synchronization speed $S_0$, the process proceeds to Step 110 in which the aforesaid normal processing is executed.

If it is judged in Step 114 that the set value of the shutter speed S is equal to or larger than the value of the flash synchronization speed $S_0$, the process proceeds from Step 114 to Step 116 in which the flag F is set. Then, in Step 118, the set value of the shutter speed S is temporarily stored as a value M and, in Step 120, the set value of the shutter speed S is rewritten with 1/100 seconds which is a shutter speed one-step slower than the flash synchronization speed $S_0$. Subsequently, the process returns to the main routine.

Thereafter, while the CPU 10 is continuously receiving the main capacitor change completion signal, that is, while the level of the voltage developed across the main capacitor is being equal to or higher than the level of a reference voltage, if the up switch 14 or the down switch 16 is depressed, the process proceeds through Step 112 to Step 121 in which the flag F is reset. Then, after the aforesaid normal processing has been executed in Step 110, the process returns to the main routine.

Accordingly, if the set value of the shutter speed S is forcibly rewritten with 1/100 seconds by turning on the flash switch in a state wherein the set value of the shutter speed S is manually set to 1/1,000 seconds, the set value of the shutter speed S is reduced to 1/60 seconds with a single depression of the down switch 16. This enables a reduction in the time period required for a shutter speed setting operation.

After a predetermined cycle of flash photography has been completed and the main capacitor charge completion signal has disappeared, if the up switch 14 or the down switch 16 is depressed, the process proceeds from Step 106 to Step 108.

Unless the up switch 14 or the down switch 16 is depressed while the CPU 10 is receiving the main capacitor charge completion signal, the process proceeds from Step 108 to Step 124 since the flag F is set in Step 116. In Step 124, the set value of the shutter speed S is set to the value M which is temporarily stored in Step 118 and, in Step 126, the flag F is reset.

Therefore, the set value of the shutter speed S is forcibly rewritten with the previous value which was selected prior to the start of the flash photographing cycle. Accordingly, a new photographing cycle can be started under the photographic conditions which were selected previous to the flash photography, without the need to depress the up switch 14 many times. If the photographic conditions have varied when the flash photography is completed, the up switch 14 or the down switch 16 can be depressed to increase or decrease the set value of the shutter speed S from the previous value which was selected prior to the flash photography, thereby enabling setting of a desired shutter speed through a short-time operation.

While the CPU 10 is continuously receiving the main capacitor charge completion signal, if the up switch 14 or the down switch 16 is depressed, the process proceeds through Step 108 to Step 110 since the flag F is reset in Step 121. In Step 110, the aforesaid normal processing is executed.

The manual operation through the up or down switch 14 or 16 is given priority, and the set value of the shutter speed S is not returned to the shutter speed which was set previous to the forced rewriting. Accordingly, manual setting operation is not restricted to an excessive extent.

The set value of the shutter speed S which has been manually set or forcibly rewritten in this manner is displayed on the LCD 22 by a routine (not shown) and, in turn, is used for shutter control.

Another preferred embodiment of the present invention will be described below with reference to FIG. 4.

Figure 3:
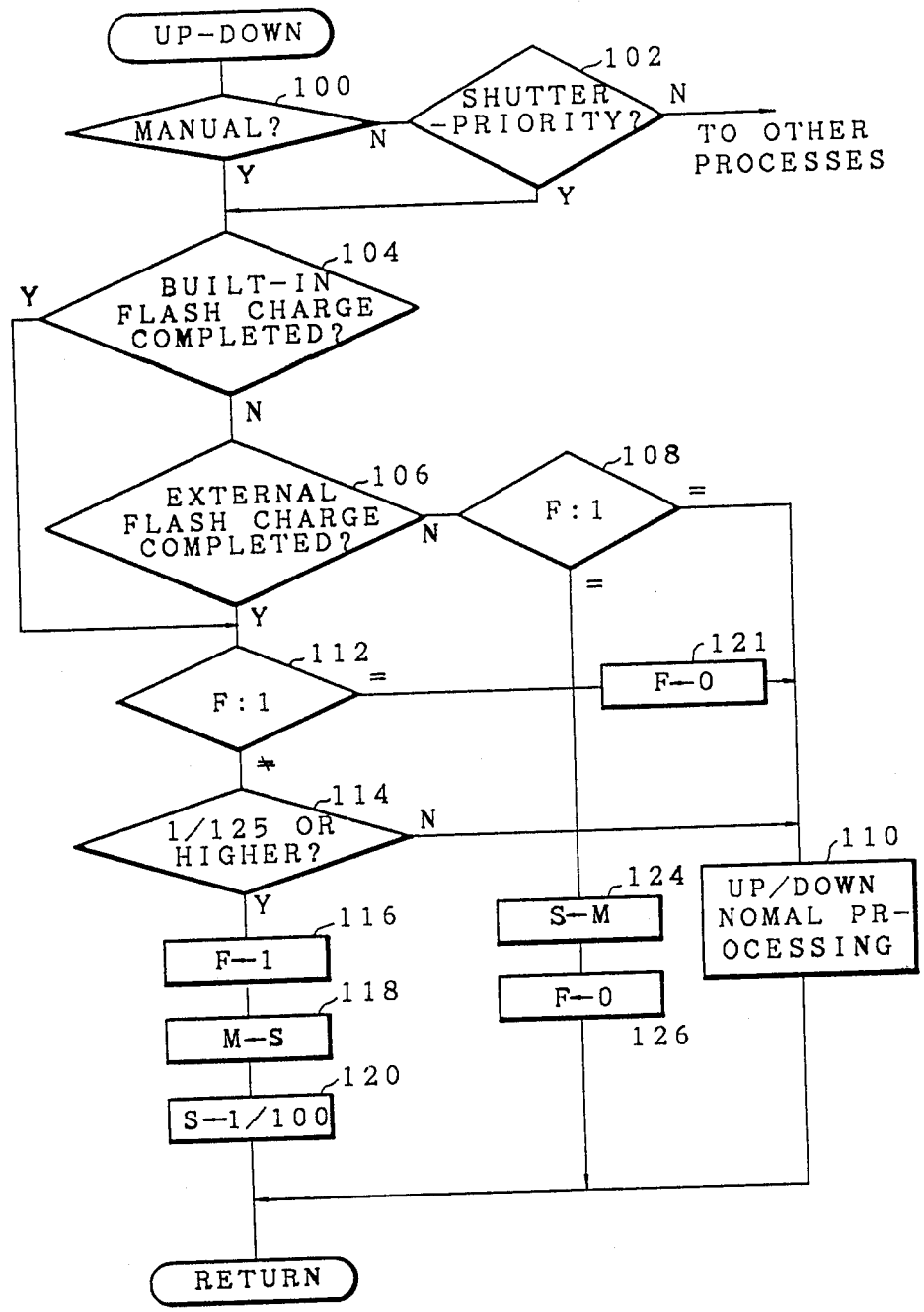
FIG. 3 is a flow chart illustrating a process sequence of steps executed by the CPU shown in FIG. 2.

This preferred embodiment further includes Steps 109, 119, 120 and 128 in addition to the steps illustrated in FIG. 3.

In the manual shooting mode or the shutter-priority AE shooting mode, if the CPU 10 is receiving the main capacitor charge completion signal and the set value of the shutter speed S is larger than the value of the flash synchronization speed $S_0$, the process proceeds the Step 119 after Steps 100 to 118 have been executed. In Step 119, judgement is made as to whether or not slow-shutter speed sync photography is selected. For example, in the case of a mode in which a photograph is taken while both an electronic flash unit externally attached to the camera body and an electronic flash unit built-in the came body are being flashed with a slight time lag therebetween or a mode in which an electronic flash unit is flashed in synchronization with the timing at which the rear curtain of a focal plane shutter starts to run, it is judged that the slow-shutter speed sync photography is selected.

Each of these modes is manually set, and the previously-mentioned main CPU (not shown) provides a signal for discriminating between these modes.

In the case of slow-shutter speed sync photography, the process proceeds to Step 120 in which the set value of the shutter speed S is set to 1/60 seconds. Otherwise, the process proceeds to Step 120' in which the set value of the shutter speed S is set to 1/100 seconds.

Subsequently, the process proceeds to Step 128 in which an up processing for increasing the set value of the shutter speed S to be executed in Step 110 is inhibited.

Then, in a case where the up switch 14 or the down switch 16 is depressed prior to flash photography, the previously-mentioned normal processing is executed in Step 110 after Steps 100 to 112 and 121 have been executed. However, since the up processing of increasing the shutter speed S is inhibited in Step 128, depression of the up switch 14 is ignored. Accordingly, even if the up switch 14 is carelessly depressed, the set value of the shutter speed S is maintained at a speed slower than the flash synchronization speed $S_0$.

In a case where the up switch 14 is depressed after completion of flash photography, the process proceeds to Step 109 in which the inhibition of the up processing for the shutter speed S in Step 128 is cancelled and, in Step 110, the up processing for the shutter speed is executed.

It will be appreciated that the present invention embraces various other modifications and alternatives in addition to the above-described preferred embodiments.

By way of example, in each of the above embodiments, the up/down switch is constituted by a pair of push switches (the up switch 14 and the down switch 16). However, the up/down switch may of course be constituted by a single toggle switch, seesaw switch or slide switch.

Figure 4:
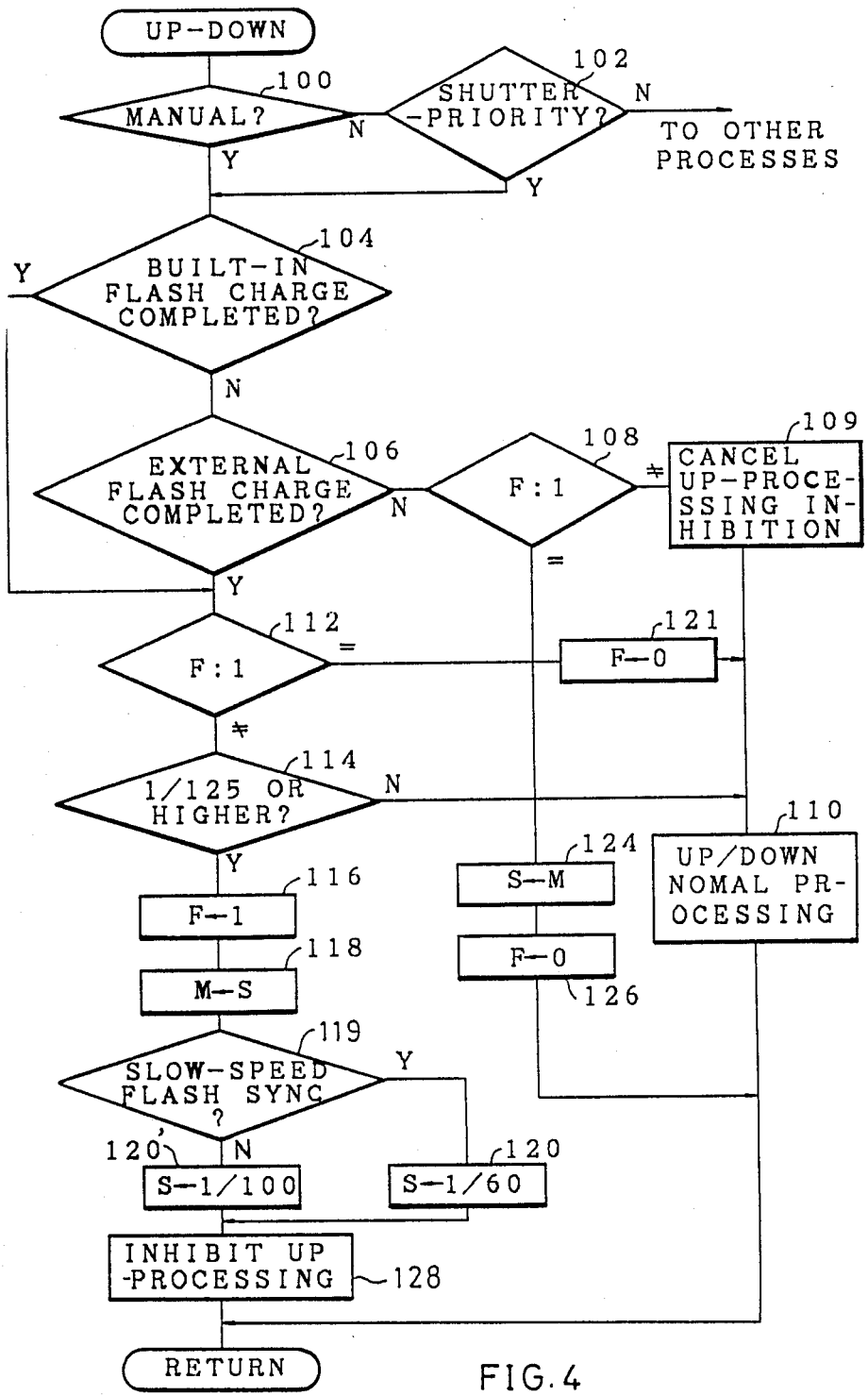
FIG. 4 is a flow chart illustrating a process sequence of steps executed in a second preferred embodiment of the present invention.

In the flow charts shown in FIGS. 3 and 4, the step 112 may be omitted, that is, the process may proceed directly from Step 112 to Step 110.

What is claimed is:

1. A shutter speed setting apparatus comprising:
    shutter speed setting means for manually setting a shutter speed S through an up/down switch used to increase and decrease a set value;
    judgement means responsive to a main capacitor charge completion signal for judging whether or not said manually set shutter speed S is higher than a flash synchronization speed $S_0$;
    set value storing means for temporarily storing said manually set shutter speed S in the form of a value M in a case where said judgement means judges that said manually set shutter speed S is higher than said flash synchronization speed $S_0$; and
    set value rewriting means for rewriting said manually set shutter speed S with a given shutter speed not higher than said flash synchronization speed $S_0$ in a case where said judgement means judges that said manually set shutter speed S is higher than said flash synchronization speed $S_0$ and for rewriting said manually set shutter speed S with said value M which is temporarily stored in said set value storing means after said main capacitor charge completion signal has disappeared.

2. The apparatus according to claim 1, wherein, in a case where said set value rewriting means rewrites said manually set shutter speed S with a given shutter speed not higher than said flash synchronization speed $S_0$, said set value rewriting means rewrites said manually set shutter speed S with a shutter speed which is slower under slow-shutter speed synchronization conditions than otherwise.

3. The apparatus according to claim 1, wherein, after said main capacitor charge completion signal has disappeared, said set value rewriting means rewrites said manually set shutter speed S with said value M temporarily stored in said set value storing means on condition that said up/down switch is not operated during supply of said main capacitor charge completion signal after said set value rewriting means has rewritten said manually set shutter speed S with a given shutter speed not higher than said flash synchronization speed $S_0$, whereas, if said up/down switch is operated during supply of said main capacitor charge completion signal after said set value rewriting means has rewritten said manually set shutter speed S with a given shutter speed not higher than said flash synchronization speed $S_0$, said set value rewriting means does not rewrite said manually set shutter speed S with said value M even after said main capacitor charge completion signal has disappeared.

4. The apparatus according to claim 1, wherein said set value rewriting means is inhibited from executing processing to increase said set shutter speed S, provided that said up/down switch is operated during supply of said main capacitor charge completion signal after said set value rewriting means has rewritten said manually set shutter speed S with a given shutter speed not higher than said flash synchronization speed $S_0$.

5. The apparatus according to claim 1, wherein said up/down switch includes an up switch used to increase said set value and a down switch used to decrease said set value, said up switch and said down switch being disposed separately from each other.

* * * * *